Aug. 26, 1930.     C. M. JACOBSEN     1,774,273
SWITCH MECHANISM FOR SIGNALING DEVICES FOR MOTOR DRIVEN VEHICLES
Filed Feb. 27, 1928
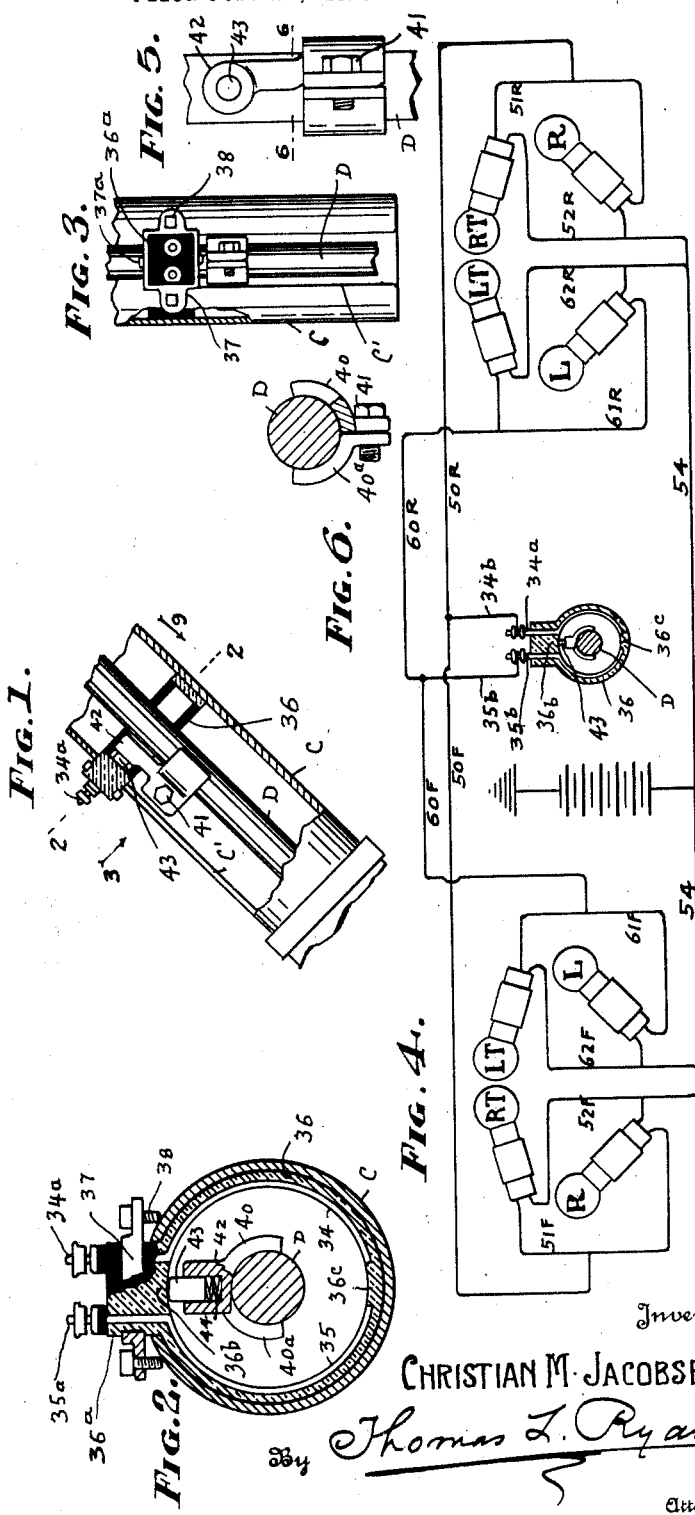
Inventor
CHRISTIAN M. JACOBSEN
By Thomas L. Ryan
Attorney Patented Aug. 26, 1930

1,774,273

UNITED STATES PATENT OFFICE

CHRISTIAN M. JACOBSEN, OF NEWCASTLE, INDIANA

SWITCH MECHANISM FOR SIGNALING DEVICES FOR MOTOR-DRIVEN VEHICLES

Application filed February 27, 1928. Serial No. 257,256.

This invention relates to improvements in electric switching devices for operating the direction-indicating signals of automobiles and motor driven vehicles of all kinds. To provide a switch of this character which is dependable in action, relatively easy to install, and which is economical of construction, is the general object of my invention.

Figure 1 is a longitudinal central sectional view of the lower portion of a support column, and the steering wheel stem of well known type, and in which said view my new and improved switch mechanism is shown in central cross section, the switch bar thereof which is adapted to be actuated by the said steering stem, being shown in elevation.

Figure 2 is an enlarged cross section view taken on the line 2—2 and as viewed in the direction of arrow 2 in Figure 1.

Figure 3 is a front view of the invention, and the lower portion of the support column of the steering stem, as seen in direction of the arrow 3 in Figure 1.

Figure 4 is a diagrammatic view showing a plan of wiring which may be used.

Figure 5 is an enlarged front view of the switch element, as seen in the direction of arrow 3 in Figure 1.

Figure 6 is a sectional plan view taken on the line 6—6 in Figure 5.

My improved switch mechanism is shown in the form and structure suitable for use, either as standard equipment, or as an accessory to be installed on automobiles already constructed.

The invention contemplates the combination with the support column in which the stem of the steering wheel is operated, there being a longitudinal slot provided in said column, of a ring-shaped non-conductive support member having a head portion adapted for disposition in the said slot, and a body portion adapted to rest immediately upon the interior of the column, means to secure the support member to the column, opposed arcuate conductive strips seated upon the interior of said support member, terminal posts extended from said conductive strips and through the head portion of said support member, a wrist clip adapted to be secured to the steering stem at position adjacent to the support member, and yieldable conductive connections between the wrist clip and the said arcuate conductive strips.

The support member 36 is ring shaped in plan and it may be made of bakelite or other stout insulatory material; its head portion 36ª being of the suitable proportions as shown in Figure 2.

Opposed similar arcuate conductive strips 34 and 35, of brass or other suitable conductive metal, are seated in inlaid order upon the interior of the said support ring 36. Terminal posts 34ª and 35ª which extend from said conductive strips are securely retained in the integrally formed head portion 36ª of the said support ring. The said conductive strips are so spaced, that the portions 36ᵇ and 36ᶜ of the support ring constitute insulation between the proximate ends of the said strips.

A metal yoke 37 which is secured by a set screw 37ª or by other suitable means, to the head 36ª of the support ring, has its projecting ends provided with cap screws 38. Provided in the support column C, is a longitudinal slot C¹ of the suitable width and length as shown in Figures 1 and 3. After the said support ring has been inserted in the column and disposed in place, as shown in Figure 1, the cap screws 38 are tightened against the column, the said support ring being thereby held immovably at its set position.

A wrist clip is adapted to be secured to the stem D of the steering mechanism. This switch member, as shown in detail in Figures 2, 5 and 6, consists of similar arcuate complemental bars 40 and 40ª which are adapted to embrace the steering stem to the extent of slightly more than one half the circumference thereof. Each of said clip bars has a flange. A bolt 41 passed through a hole in one of these flanges, is screwed through a threaded hole therefor in the other flange, so that while these clip bars are thus joined loosely together, and are capable of being inserted through the slot C of the support column and disposed at position on the stem D, they are drawn to and held in secure engagement with the said stem, by a tightening of the bolt 41. Formed integral with the clip bar 40, is a head 42. In a smooth bore or well which is provided in this head 42, a slug like contact piece 43 which may consist of carbon or conductive metal, is retained. This contact brush 43 is urged outwardly by a coil spring 44 which is retained underneath same as shown in Figure 9.

To place the said wrist clip in position on the stem, it is inserted through the slot C' of the support column C (the bolt 41 having been loosened) and the clip bars are placed on each side of the stem D. The contact brush 43 is held at depressed position as the wrist clip is moved on the stem to the desired height, as shown in Figure 1, whence the action of the spring 44 is to hold the contact brush at outwardly urged position. Then by tightening the bolt 41 the wrist clip is clamped securely in position.

In reading the diagrammatic view of the wiring as shown in Figure 4, it will be understood that the ground consists of the stem D of the steering mechanism, and the frame of the car.

The wrist clip is held at the correctly adjusted position by the bolt 41.

The relative positions of the several parts of the invention, when the steering mechanism of the car is set for the straight ahead travel, are shown in Figure 4, the switch brush 43 being at the neutral or open status and in engagement with the portion 36$^b$ of the di-electric support ring 36. When the steering wheel (not shown) is moved to the right (directing the car to the right accordingly) the brush makes contact with the arcuate strip 34, closing the circuit through post 34$^a$, wire 34$^b$, 50$^r$, 50$^f$, 51$^r$, 51$^f$, 52$^r$, 52$^f$, wire 54, battery, ground, and stem D, thus energizing the lamp bulbs RT and bulb R, in a rear housing, and the bulbs RT, and R, in a front housing (not shown) and illuminating the legend Turning, and the legend To right, respectively.

With the return of the vehicle to the line of travel straight ahead, and the return of the stem D and the brush 43 to the neutral position, there is the opening of the circuit, and the consequent extinguishment of the lamps.

With a movement of the steering wheel to the left (turning the vehicle to the left accordingly) the brush 43 makes contact with the arcuate strip 35, closing the circuit through post 35$^a$, wire 35$^b$, 60$^r$, 61$^r$, 61$^f$, 62$^r$, 62$^f$, wire 54, battery, ground, and stem D, thus energizing the lamp bulbs LT and bulb L, in a rear housing, and bulbs LT, and L, in a front housing (not shown) and illuminating a legend Turning, and a legend To left, respectively.

With a return of the vehicle to the straight line ahead, and the stem D and switch member 43 to neutral position, there is the opening of the circuit and the consequent extinguishment of the lights.

Advantages of the invention are that the driver of the car approaching, either from the front or from the rear, may receive the signal, it being only necessary for the operator or move the steering-wheel very slightly to the right or to the left, to indicate the intention to the approaching driver, as to whether the turn of the vehicle is to be to the right or to the left. Such means of indicating is also an aid to traffic authorities, and also it eliminates the necessity of the operator making signals by extending his arm from the car.

Whereas I have shown the embodiment and details of construction preferred for carrying my invention into effect, I am aware that modification may be made within the scope of the invention as same is defined in the appended claims, without departing from the spirit of my invention, or sacrificing any of its advantages.

What I claim as my invention, and desire to secure by Letters Patent is:—

1. In a switch mechanism for motor-cars, the combination with the support column in which the stem of the steering wheel is operated, there being a longitudinal slot provided in said support column, of a non-conductive support member having a central bore and being provided with a head portion adapted to rest within said slot, means to secure the said support member at fixed position, diametrically opposed conductive strips seated in the bore of said support member, terminal posts extended from said conductive strips and through the head portion of the said support member, a wrist clip removably secured to the steering stem and adapted to be moved to and secured in position adjacent to the said support member, and a yieldable conductive means between the wrist clip and the bore of said support member.

2. In a switch mechanism for the electric signaling systems of motor cars, the combination with the support column in which the stem of the steering wheel is operated, there being an opening provided in the wall of the support column, of a ring shaped non-conductive support member provided with a head portion adapted to rest in and to project through the said opening, diametrically opposed conductive strips seated in the interior face of said support member, terminal posts extended from said conductive strips and through the head portion of the support member, a transverse yoke secured to said head portion and having transverse flanges, set screws in said flanges capable of being tightened against the exterior of the support column, a wrist clip capable of being inserted through the opening in said support column, and of being set and secured in adjusted position with reference to the position of the said ring shaped support member, and a spring-pressed conductive member in said wrist clip which is maintained in outwardly disposed position.

3. A switch device for a motor vehicle steering mechanism, having the usual support column and steering stem, there being a longitudinal slot provided in the said column, the said switch device comprising a non-conductive support ring of diameter to be slipped inside the column, and having a head portion to occupy the said slot in said column, a transverse yoke secured on said head portion, set screws in said yoke adapted to be tightened against the exterior of the column, whereby to hold the ring securely in position, opposed semicircular conductve strips seated flush in the interior of said support ring, their proximate ends being spaced apart, a terminal post extended from each of said conductive strips and through the head portion of said support ring, a wrist clip capable of being applied on and to be secured to the steering stem at adjusted position adjacent to the support ring, and a spring pressed contact member carried by said wrist and having bearing against the interior of said support ring and the said conductive strips.

4. In a switch device of the kind described in combination with the column having a slot therein and an insulatory ring having opposed arcuate conductive strips, a wrist member of divided formation, its complemental body sections being loosely joined together, and adapted to be passed through said slot, to embracement with and to be tightened against the sides of the steering stem, one of said body sections having a head extending longitudinally of the said stem, and having a radial recess therein, a contact brush loose in said recess, and a spring in said recess to urge the contact brush outwardly.

CHRISTIAN M. JACOBSEN.